United States Patent Office 3,674,504
Patented July 4, 1972

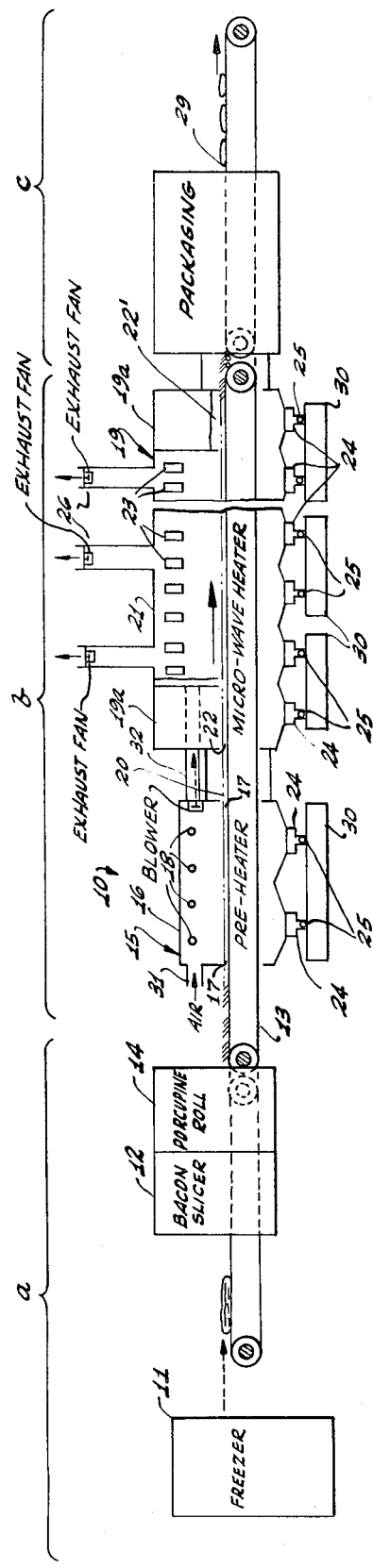

3,674,504
PROCESS FOR COOKING BACON AND OTHER MEAT PRODUCTS USING INFRA-RED AND MICROWAVE ENERGY
Alan B. Lane, Northridge, Calif., assignor to Hunt-Wesson Foods, Inc., Fullerton, Calif.
Continuation of application Ser. No. 737,074, June 14, 1968, which is a continuation-in-part of application Ser. No. 646,008, June 14, 1967. This application June 5, 1970, Ser. No. 41,778
Int. Cl. A22c *18/00*
U.S. Cl. 99—107                     5 Claims

ABSTRACT OF THE DISCLOSURE

A process for cooking cold or refrigerated bacon and other meat products comprising preheating the sliced and shingled bacon or other meat products by conventional means, e.g. infra-red heating, to a temperature above about 50° F. and preferably below 150° F. and thereafter further heating the meat product by microwave energy until it is properly precooked to a desired degree.

CROSS-REFERENCES TO RELATED APPLICATIONS

This application is a streamline continuation of application Ser. No. 737,074 filed June 14, 1968, now abandoned which was a continuation-in-part of patent application Ser. No. 646,008, entitled Process for Cooking Bacon and Other Meat Products by Microwave Energy, filed June 14, 1967 now abandoned.

BACKGROUND OF THE INVENTION

This invention relates broadly to food processing and, more particularly, to a method and means for cooking bacon and other meat products.

Conventionally, cooking of meats has been accomplished by heating the foods using, for example, open fires, electricity and gas. The disadvantage of each of these sources of heat is that the meat is heated unevenly. That is, because of the relatively low thermal conductivity of meats, the portion of the meat which is exposed to the heat source will be heated to a substantially higher temperature (in the same time) than portions of the meat which are not exposed directly to the heat source. Therefore, parts of the meat may be burned while other parts of the meat remain uncooked.

In recent years, a new heating method has been developed to overcome the foregoing disadvantages of conventional heating methods. This new method employs microwave energy which is energy having wavelengths below about 30 cm. The principle of microwave heating stems from a rubbing together of the molecules within a product through which the microwaves pass. The molecules in the product—acting like miniature magnets—attempt to align themselves with the electrical field of the microwaves passing through it. From the action of the swiftly moving molecules, heat is created, just as in the old principle of rubbing two sticks together to start a campfire. The principal characteristic of microwave heating is that all portions of the food are cooked simultaneously.

In spite of the advantages of microwave cooking, this cooking method has not been succesfully utilized heretofore, to the best of our knowledge, for the precooking of cold or refrigerated bacon for the following reasons. When cold or refrigerated bacon is cooked by microwaves, the bacon is reduced unevenly and tends to "blossom" or wrinkle in a characteristic rosette pattern. Bacon which has "blossomed" is not readily marketable because it is not aesthetically pleasing. Additionally, because the bacon slices are reduced unevenly, the bacon product cannot be packaged by automatic or semi-automatic packaging means. Furthermore, when bacon slices are shingled, that is, partially overlayed to permit more compact packaging, microwave heating causes the protein portions of the bacon strips to anneal to each other making it very difficult to separate the shingled strips. Furthermore, the use of microwave energy, as a source of heat, is quite costly.

SUMMARY OF THE INVENTION

Because of the rapid pace of modern society, "convenience" foods have achieved a ready market. Many foods are precooked so that the consumer only has to reheat the food for a short time, e.g., a few minutes or less to make the food palatable. To this end, it is a principal object of this invention to utilize microwave energy to produce precooked shingled bacon and other meat products which have a good appearance and which are evenly cooked, and to avoid the problems heretofore thought inherent in cooking with microwave energy.

This object is accomplished by heating bacon, in shingled fashion, or other meat products (which are normally stored at or below 32° F.) by heating bacon by electromagnetic energy in the infra-red region to a temperature above about 50° F. and preferably below about 150° F. prior to cooking of the bacon or other meat by microwave heating. This combination of heating cold or refrigerated bacon within particular temperature limits by infra-red energy and then immediately further heating the bacon by microwave energy, produces a precooked bacon or other meat product which is uniform in size, which is uniformly cooked and in which the bacon slices are not annealed to each other. Additionally, the cooked bacon is aesthetically pleasing and easily lends itself to automatic or semi-automatic packaging methods. In the case of meat products other than bacon, in which annealing of the individual pieces or slices may not be a problem, it is found that this combination of heating sources is more economical and thus gives rise to a substantially greater production capability for a given microwave oven.

DESCRIPTION OF THE DRAWING

The figure is a schematic representation of a process line including the preheating and microwave heating steps of this invention.

DESCRIPTION OF THE PREFERRED EMBODIMENT

In general, this invention comprises a method and means for cooking bacon (which has been stored at temperatures, substantially below ambient) or other meat products comprising (a) raising the temperature of the meat product above a specific temperature by any suitable heating method other than by microwave heating, e.g. infra-red, (b) introducing the meat product at a temperature above this specific temperature into a microwave oven and (c) cooking the meat product with microwave energy until it is cooked a desired amount. More specifically, in the preferred embodiment, the meat product is preheated by infra-red heating to an average temperature of above about 50° F. and preferably below about an average temperature of 150° F., transferred at this elevated temperature into a microwave oven and then cooked, by microwave energy, for a predetermined time.

The average temperature of an individual bacon slice is determined by measuring the temperature of both the fat and lean portions of an individual bacon slice, by suitable means, such as by means of thermocouple probes set into the slice a predetermined distance from the surface of the slice. The temperature variation between fat and lean portions of an individual slice may vary as much as 25°–

35° F. Thus, if the lean portion measures 50° F. and the fat portion 75° F., the average temperature of the bacon slice is 62.5° F. for the purposes of this specification and claims.

The average temperature of other meat products such as sausage, hamburger, pork and ham is much more uniform within an individual piece.

The result of cooking bacon which has been held at temperatures substantially below ambient by the herein-described combination of conventional (infra-red and non-microwave) heating and microwave heating, is the production of evenly cooked, aesthetically-pleasing bacon. The cooked beacon so produced is substantially uniform in size and, because it is shingled initially, it can be easily and economically packaged. Additionally, if a by-product is produced which is clean and clear in appearance and which can be sold without extensive filtering. Sale of this fat by-product substantially reduces the unit cost of the process of this invention.

The reason for the differences in the bacon product when the bacon is cooked solely by microwave energy as compared to cooking bacon by the combination of conventional heating the bacon above about 50° F. and thereafter cooking the bacon with microwave energy is not presently completely understood. However, experiments have shown that the bacon product produced by a combination of microwave and conventional heating (preheating above about an average temperature of 50° F.) is substantially superior to the product produced solely by microwave heating bacon initially at temperatures below about an average temperature of 50° F.

Experiments have shown that the undesirable results produced when cold or refrigerated bacon is cooked solely by microwave energy are produced early in the microwave cooking period. That is, in about the first fifteen seconds of microwave cooking, the bacon begins to "blossom" and to non-uniformly reduce in size. After substantial experimentation, it was found that "blossoming" is completely avoided by heating the bacon by conventional, e.g. infrared, means above 50° F. prior to its subjection to microwave heating.

Conventional heating of bacon after it has been heated solely by microwave energy will not eliminate the undesirable effects produced by the prior microwave cooking. Also, cooking cold or refrigerated bacon with a simultaneous combination of microwave and conventional heating means almost invariably produces a "blossoming" of the bacon, as heretofore mentioned.

In addition to preheating the bacon by conventional means (as opposed to post—or simultaneous heating) it has been experimentally determined that the bacon must be brought up to at least a minimum average temperature. This minimum average temperature has been determined to be about 60° F. for optimum results. If some curling or annealing can be tolerated about 50° F. would be the minimum temperature. As mentioned, this minimum temperature is an average minimum temperature established by averaging the temperatures of the fat and lean areas of individual bacon slices by means of probes attached to thermocouples.

To determine the average minimum temperature to which the bacon must be conventionally preheated, frozen bacon slices were permitted to thaw for varying periods in ambient atmosphere (70° F.) to provide a series of bacon slices at various temperatures as shown in Table I. Each bacon slice was then introduced, at the temperature to which it had been raised, into a microwave oven and cooked at a predetermined power setting for a predetermined time, the microwave power setting and cooking time being the same for each slice of bacon. Following the microwave cooking, the bacon slices were removed from the microwave oven and their weight loss was determined and their appearance observed. The data and observations from these tests are shown in Table I.

TABLE I

| Test No. | Bacon temp.(° F.) Initial | Bacon temp.(° F.) Preheat[1] | Microwave heating time (sec.) | Bacon weight (gm.) Initial | Bacon weight (gm.) After cooking | Observations of cooked bacon |
| --- | --- | --- | --- | --- | --- | --- |
| 1 | 32 | 35 | 105 | 56 | 21 | Severe curling and annealing. |
| 2 | 32 | 35 | 105 | 55 | 21 | Do. |
| 3 | 32 | 40 | 105 | 58 | 21 | Do. |
| 4 | 32 | 40 | 100 | 57 | 25 | Do. |
| 5 | 32 | 45 | 100 | 55 | 19 | Do. |
| 6 | 32 | 45 | 100 | 50 | 20 | Moderate curling and annealing. |
| 7 | 32 | 50 | 100 | 51 | 18 | Do. |
| 8 | 32 | 50 | 100 | 55 | 18 | Do. |
| 9 | 32 | 55 | 98 | 54 | 19 | Do. |
| 10 | 32 | 55 | 98 | 56 | 20 | Do. |
| 11 | 32 | 60 | 98 | 57 | 18 | Slight curling and annealing. |
| 12 | 32 | 60 | 95 | 57 | 18 | Do. |
| 13 | 32 | 65 | 90 | 54 | 16 | Do. |
| 14 | 32 | 65 | 85 | 51 | 17 | Do. |

[1] Average temperature of fat and lean area.

As will be noted from Table I, the appearance of the bacon (shape, conformity, curling) improves markedly as the temperature to which the bacon is initially raised increases. Below about 60° F., the bacon slices are characterized by too much curling, annealing, and lack of shape uniformity to be readily marketable. Above about 60° F., the bacon slices after cooking by microwave energy are substantially uniform in size and are aesthetically pleasing in appearance. Because there is substantial variation in bacon slices initially, for example, in the ratio of fat to lean portions, it is preferable to preheat the bacon slices to an average temperature of about 65° F. to provide a margin of safety so that substantially all bacon slices will be cooked as desired. It should be noted that, for some purposes where top quality may not be absolutely required, a 50° F. minimum temperature would impart a greater annealing and curling effect but it may still result in commercially useable bacon.

As will also be noted from Table I, the microwave heating time required to reduce the initial weight of the bacon by a particular fraction decreases markedly as the temperature of the preheated bacon increases. For example, at a preheat temperature of 35° F., 105 seconds are required to reduce the bacon to a weight of about 37.5% of the initial weight. This is to be compared with the 87.5 seconds (avg.) required to reduce bacon preheated to 65° F. to 31.5% (avg.) of its initial weight. In general, as the preheat temperature is increased, the time and therefore the energy requirements and cost required for the microwave heating phase decreases. The result is that preheating the bacon above about 50° F. makes for an overall more economical process and, in numerical terms, indicates a greater production capability of the microwave section of from about 25–50%.

There is an upper limit of temperature beyond which the bacon should not be heated prior to its subjection to microwave heating, and that upper limit is dictated by the temperature at which the bacon slices in the shingled relationship commence to disassemble. For as the temperature increases beyond such upper limit, the fats commence to liquefy until the bacon slices, originally in shingled (slightly overlapping) relationship, begin to slip relative to each other. The upper temperature limit at which this separation occurs is about 150° F. The preheating temperature limits, prior to microwave heating, thus lie between about 50° F. to about 150° F., in order to obtain the benefits of this invention, namely the economical, continuous production of precooked shingled, non-annealed bacon and other meat products, whether arranged in shingled fashion or not at the outset of their travel through the heating sections of the oven.

Some fat is rendered from the bacon in the preheat section of the oven and this is collected in troughs. Any spattering of the fat does not present a problem because the heating units are placed well above the line of travel of the bacon.

After the bacon is preheated, it is then cooked in a microwave oven until the bacon reaches a desired consistency. In the microwave oven, the bacon is generally heated to about 200° F., though it may reach a temperature as high as 275° F. A great percentage of the total fats and water removed from the bacon is removed during the microwave heating. About 60–70% of the weight of the original bacon weight is rendered.

Other meat products such as sausage, hamburger, or ham are advantageously precooked in the process of this invention as well. In the process of sausage, hamburger and ham, a preheat, by infra-red or other non-microwave means, to between about 50–150° F. is employed as described with reference to bacon. Thereafter, the preheated meat is cooked by microwave energy until between about 15–40% of the initial weight of products such as hamburgr and sausage is lost, and until between about 15–30% of the initial weight of the ham is lost. In general, the amount of weight loss of meat products processed in accordance with this invention lies between about 15% and 70%.

A typical process line, incorporating the combination of a preheater and a microwave heater for performing the process of this invention with reference to bacon will now be described. In the figure, the numeral 10 designates a bacon processing line incorporating a bacon preparation section *a*, a cooking section *b* and a packaging section *c*. The bacon which is generally stored in bellies in a refrigerator 11 at between about 27°–32° F. is transferred to a conventional slicer 12 which slices the frozen bacon bellies into slices of desired thickness. To reduce packaging costs, the bacon bellies are preferably sliced in a timing sequence which produces a plurality of slices of bacon in each sequence and, simultaneously, partially overlays or shingles the bacon slices in each such sequence. The number of slices in each group may be varied considerably, for example, the bacon may be packaged in groups of three to thirty or more.

The sliced bacon, whether in individual slices or in a shingled mode as described, is transferred to a conveyor 13 which carries the bacon through the various heating chambers. Such transfer may be accomplished by any suitable conventional means such as, for example, a porcupine roller 14. To provide the most efficient heating of the bacon in the heating chambers, the conveyor 13 is preferably made of a non-conductive material capable of withstanding moderately high temperatures, for example, up to 400° F. A suitable material from which the conveyor may be made is silicon rubber.

The shingled bacon is next carried by the conveyor 13 into a preheater 15. Upon entry into the preheater 15, the bacon has generally risen about 2–4° F. above its refrigeration temperature, that is, the bacon is at a temperature of about 32–34° F. The speed of the conveyor 13 is adjusted so that the bacon is brought up to a temperature of at least, about 50° F. and preferably between about 65° F. and 150° F. when the bacon exits from the preheater 15.

The preheater 15 comprises an insulated housing 16 having a pair of openings 17 in opposing ends through which the bacon enters and exits on the conveyor 13. The interior of the housing 16 carries a plurality of rod-type heaters 18 disposed in a predetermined pattern to most efficiently warm the bacon strips. The heaters 18 may be any conventional type, for example, ceramic or Calrod heaters. Fat rendered from the bacon is collected in troughs 24 and thence discharged through the bottom thereof into a main collecting tank 30.

After passing through the preheater 15, the bacon is carried by the conveyor 13 into a microwave oven 19 including microwave traps 19a at each end thereof. Preferably, the heat lost by the bacon as it passes from the preheater 15 to the microwave oven 19 is minimized so that only a minimum amount of microwave energy need be used to completely cook the bacon. Minimization of this heat loss may be accomplished by, for example, connecting the preheater 15 and microwave oven 19 by an insulated duct 20.

The microwave oven 19 comprises an oven housing 21 having a pair of apertures 22, 22' in opposing walls of the housing to permit entrance and egress, respectively, of the bacon on the conveyor 13. The oven housing 21 supports a plurality of modular units 23 which produce a certain amount of microwave energy sufficient to cook a predetermined quantity of bacon per hour. The bottom portion of the microwave oven housing is sloped to form a plurality of tapered collection troughs 24 having apertures 25 in the bottoms thereof for discharging the liquid fat rendered from the bacon slices into collectors 30.

To facilitate collection of the fat it is preferable that the conveyor belt be formed of a material provided with openings so that the liquid fat can flow downward through the interstices in the belt and into the collection troughs 24. The conveyor belt 13 carrying the bacon through the microwave oven may be made of any material which is compatible with microwaves, that is, which is not affected by the microwaves. Such a material is silicon rubber and, since silicon rubber is a desirable material for the conveyor belt for carrying the bacon through the preheater 15, a single conveyor belt may be employed to transport the bacon through the heating section *b*.

The microwave oven 19 also contains discharge ducts 26 in the roof of the oven housing 21 for conducting away substantial amounts of the water vapor which are produced from the water contained in the bacon when the bacon is subjected to microwave energy. These discharge ducts are preferably located above the location within the microwave oven 19 at which the largest amounts of water vapor are produced, that is, near the microwave oven entrance 22.

The microwave energy, emitted by the modular units passes through waveguides (not shown) which guide the microwaves into directional streams. Bacon which is irradiated by microwave energy from the center of these streams will usually be cooked before bacon which is irradiated by microwaves at the periphery of these streams. Therefore, it is preferable to incorporate a means for deflecting or stirring the microwaves so that all of the bacon is subjected to substantially the same quantity of microwave energy in the same time. This may be accomplished by employing spinners or electronic stirrers in conjunction with the waveguides to break up the substantially unidirectional flow provided by the waveguiders.

Because the meat products invariably contain substantial amounts of water, and because the presence of water vapors in the microwave heating zone of the process would cause great inefficiencies in heating by microwave energy, provision has been made for removal of water vapors produced in microwave oven 19 as follows: air is introduced into preheater section 15, via pipe 31, and is directed over the rod type heaters or other elements 18. The air is thereby heated in its passage through preheater 15. The heated air is then directed, through pipe 32 into microwave oven 19, and passes through the oven picking up water vapors residing therein and exiting via exhaust pipes 26. The just-described means provides a simple and efficient mode of ridding the atmosphere within the microwave cooking section of water vapors, as well as fat vapors.

After being subjected to microwave heating in the microwave oven 19, the bacon exits on the conveyor 13 from the oven at a temperature of about 200° F. At this stage, approximately 60–70% of the weight of each bacon slice has been removed, principally as fat and water. For example, a shingled mode comprising four slices of bacon in shingled relation and having dimensions of 9.5 to 10 inches by 3.5 inches prior to its introduction into the preheater, has dimensions of about 5.5 to 6 inches by 2.5 inches as it exits from the microwave oven.

The cooked bacon is next preferably transferred to another conveyor 29 which transports the cooked bacon to the packaging section c. Here the bacon is preferably packaged in shingled groups of anywhere from three to thirty bacon slices in foil envelopes such as described in co-pending application entitled "Improved Food Package" Ser. No. 506,349, filed Nov. 4, 1965 now Pat. No. 3,469,998 issued Sept. 30, 1969, and assigned to the instant assignee.

Modifications of the herein-described process and apparatus may be made by those skilled in the art without departing from the spirit of the invention. Therefore, the scope of this invention is to be limited only by the appended claims.

What is claimed is:

1. In a continuous process for the precooking of meat products, which is stored at below about 32° F., prior to the precooking thereof, which comprises:
   slicing said meat product while at about 32° F.;
   preheating said sliced meat product to an average tempertaure of between about 50° F. to about 150° F., in a preheating zone by infra-red energy; and
   then cooking said preheated sliced meat product by microwave energy in a microwave zone until between about 15–70% of its initial weight is rendered.

2. In the continuous process of claim 1, wherein said meat product is bacon, the additional steps of:
   slicing said bacon so that said bacon slices are arranged in shingled mode; and
   preheating and cooking said bacon in said shingled mode, in each of said preheating and microwave zones.

3. The process of claim 2 wherein said preheated bacon is cooked to a temperature of about 200° F. by said microwave energy.

4. The process of claim 1 which includes the steps of passing air through said preheating zone and thereby heating said air; and
   passing said heated air through said microwave zone and thereby carrying water and fats out of said microwave zone.

5. A continuous process for precooking refrigerated bacon slabs comprising:
   slicing said bacon slabs to produce a series of shingled slices of bacon;
   continuously feeding said shingled slices of bacon into a preheating zone;
   continuously conveying said shingled slices of bacon through said preheating zone, and heating said bacon in the presence of infra-red energy to produce bacon at an average temperature of above about 50° F. and below about 150° F.;
   then continuously conveying said preheated bacon from said preheating zone into a microwave zone;
   further heating said preheated bacon in said microwave zone for a time sufficient to render about 15–70% of the initial weight of the bacon product;
   continuously passing hot air through said microwave zone to thereby exhaust at least a portion of fats and water rendered from said bacon; and
   continuously removing said rendered bacon from said microwave zone.

References Cited
UNITED STATES PATENTS

| 2,831,952 | 4/1958 | Warner | 219—10.47 |
| 3,177,335 | 4/1965 | Fitzmayer et al. | 219—10.47 X |
| 3,352,227 | 11/1967 | Litman. | |
| 3,365,301 | 1/1968 | Lipoma et al. | |

HYMAN LORD, Primary Examiner

U.S. Cl. X.R.

99—217